United States Patent [19]

Komatsu et al.

[11] Patent Number: 5,657,011
[45] Date of Patent: Aug. 12, 1997

[54] SENSOR COIL PATTERN AND THE COORDINATE INPUT APPARATUS THEREOF

[75] Inventors: Kazuhiro Komatsu; Katsuhito Obi, both of Otone-machi, Japan

[73] Assignee: Wacom Co. Ltd., Saitama-Ken, Japan

[21] Appl. No.: 446,005

[22] Filed: May 19, 1995

[30] Foreign Application Priority Data

Mar. 10, 1995 [JP] Japan ..................................... 7-079427

[51] Int. Cl.$^6$ ..................................... H03M 1/22
[52] U.S. Cl. .................... 341/5; 341/15; 178/19; 345/173
[58] Field of Search ............................ 341/5, 15; 378/19, 378/20; 345/156, 157, 158, 173, 174, 175, 176, 177, 178, 179

[56] References Cited

U.S. PATENT DOCUMENTS 5,434,372 7/1995 Lin ............................................. 178/19
5,466,896 11/1995 Murakami et al. ....................... 178/19

FOREIGN PATENT DOCUMENTS 2-53805 11/1990 Japan.
3-147012 6/1991 Japan.

Primary Examiner—Jeffrey A. Gaffin
Assistant Examiner—Thuy-Trang N. Huynh
Attorney, Agent, or Firm—Shlesinger, Arkwright & Garvey LLP

[57] ABSTRACT

A sensor coil pattern used in combination with a coordinate input apparatus is provided, which is adapted to exactly detecting positions if a noise source such as an converter or an electrically closed conductor exists in the periphery of the apparatus. The apparatus is provided with a sensor surface having a sensor coil pattern of many sensor coils arranged thereon in parallel with each other in position detecting directions, a position indicator, a coil or a resonance circuit incorporated therein and a switching means so connected as to select simultaneously one of a plurality of a sensor coils, wherein said many sensor coils include a predetermined number of sensor coils individually connected to the switching means, said predetermined number of sensor coils including at least one or a plurality of sensor coils counted from one end of the arrangement.

12 Claims, 9 Drawing Sheets

Prior Art

Prior Art

PREFERRED WAVES

IN CASE NOISE SOURCE EXISTS

IN CASE METAL FRAME EXISTS

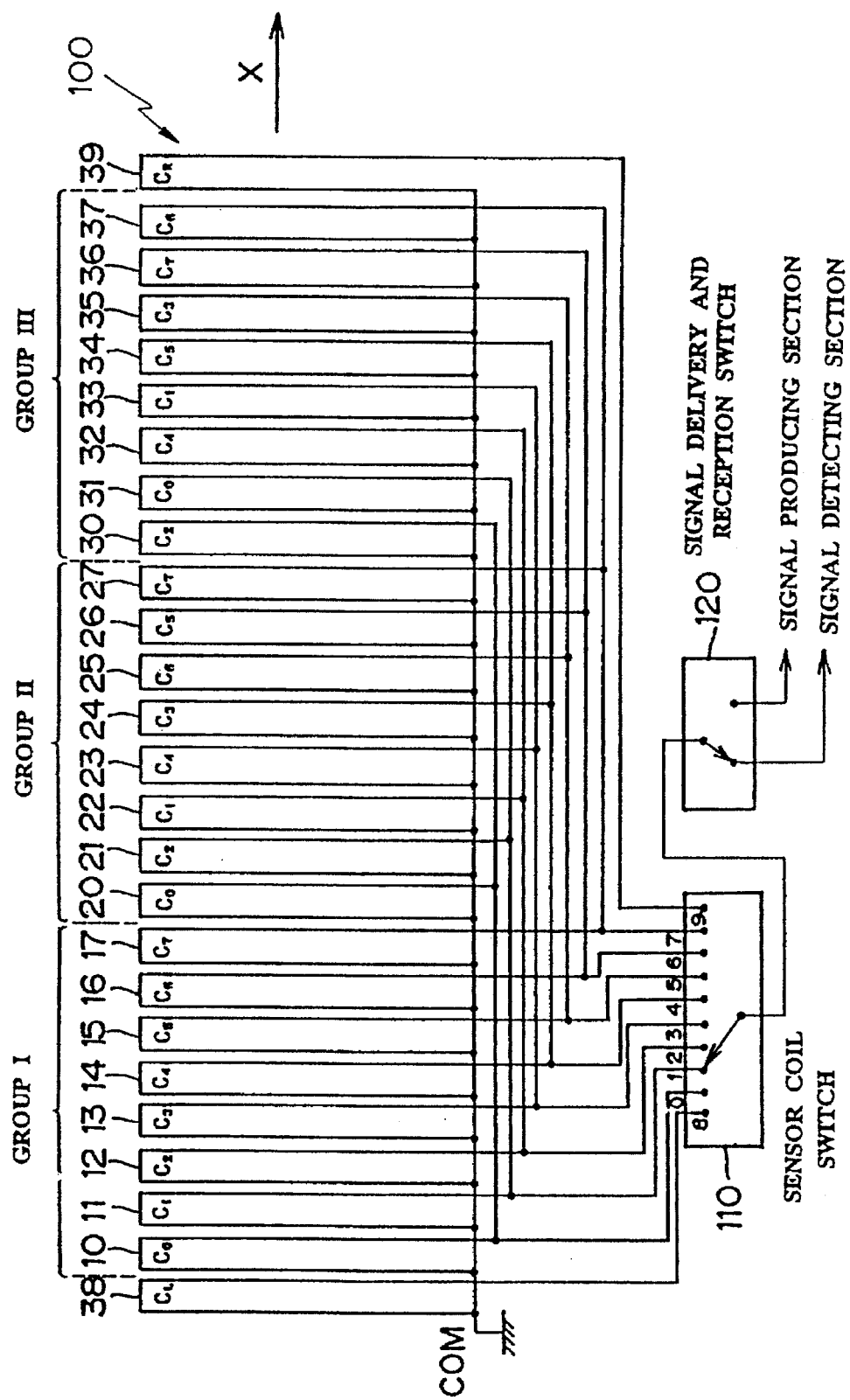

SENSOR COIL PATTERN AND THE COORDINATE INPUT APPARATUS THEREOF

BACKGROUND OF THE INVENTION

1. Field of the Invention

The present invention relates to a coordinate input apparatus called a digitizer or a tablet which is a type of input apparatus for a computer, and more particularly relating to a sensor coil pattern of a sensor surface.

2. Description of Prior Art

Regarding the coordinate input apparatus, various types of position detecting methods are generally known. Among these methods, an electromagnetic wave transmitting and receiving method is characteristic in that a position indicator may be cordless. FIG. 1 is a schematically illustrated structure of the coordinate input apparatus for explaining a basic operation thereof. In this method, the coordinate input apparatus is essentially composed of a position detecting surface (sensor surface) having many sensor coils arranged thereon in parallel with each other in position detecting directions and a position indicator such as a stylus or a cursor having a coil or a resonance circuit incorporated therein.

Normally the coordinates are detected in the directions of X- and Y-axes and therefore a pair of sensor surfaces are provided in the way as are crossed with each other at right angles in the directions of X- and Y-axes. In detecting the positions, the electromagnetic interaction is utilized between the sensor coils and the coil or resonance circuit provided in the position indicator.

More particularly with high frequency signals applied to a sensor coil, electromagnetic waves are produced at the sensor coil and then the resonance circuit in the position indicator will resonate due to the electromagnetic waves. In the next place when the delivery of the electromagnetic waves is stopped, the responsive electromagnetic waves are produced at the position indicator and then the sensor coil receives the responsive electromagnetic waves. Such signal received by the sensor coil is transmitted to a signal processing section through a signal receiving circuit.

Such operation is repeated while the many sensor coils on the sensor surface are switched over. With the distribution of the received signals thus obtained, the coordinates are determined while calculations are performed for complementing between the coordinates on the basis of the signals of a coil which is most strongly responsive and the signals of the coils in the neighborhood of the most strongly responsive coil. The detail of this electromagnetic transmitting and receiving method is disclosed in Japanese Patent Application Publication No. H2-53805.

Another position detecting method includes a more simple one in which the electromagnetic waves are delivered from the sensor surface to the position indicator or vice versa.

According to such position detecting method, so many sensor coils have to be scanned, that is, have to be progressively switched over to detect the positions. It is therefore time consuming. It takes longer time especially if the apparatus is comparatively bigger. At least it becomes necessary to scan all of the sensor coils in order to firstly seek the approximate positions of the position indicator.

Therefore if the scanning time is longer, a high speed position detecting operation is deteriorated. In consideration of this matter, a sensor coil pattern has been proposed in which a predetermined number of sensor coils are selected from the so many sensor coils and the selected sensor coils are connected with each other so as to simultaneously deliver and receive signals thereby to reduce the switching times thereof and thus to reduce the scanning time of all the sensor coils. One example of this method is disclosed in Japanese Patent Application Publication Laid-open No. H3-147012. FIG. 2 schematically shows a pattern which is disclosed in this patent application in which a predetermined number of sensor coils are connected with each other on the sensor surface 100. For the sake of simplification, the sensor coils are shown only in the direction of X-axis. The things are the same with respect to the Y-axis.

As shown below at the right end in FIG. 2, each sensor coil has a shape of two windings to increase sensitiveness and to obtain bigger signals. However in FIG. 2, for the sake of simplification, all the sensor coils are shown as of a single winding. According to the sensor coil pattern in FIG. 2, so many sensor coils are divided into a plurality of groups (though only three groups I, II, III are shown). Each group is composed of eight sensor coils. Further one sensor coil is selected from each group. The selected sensor coils are connected with each other. For example, the sensor coil 12 of group I, the sensor coil 21 of group II and the sensor coil 30 of group III are connected with each other.

One time signal transmitting and receiving operation is such that an alternate signal is simultaneously applied to the so connected sensor coils to produce electromagnetic waves thereat. Then if the position indicator is positioned in the neighborhood of any of the sensor coils, the electromagnetic interactions are performed between the position indicator and the sensor coils. Then the position indicator receives signals simultaneously from the so many connected sensor coils. For example, in reference to FIG. 2, three sensor coils 11, 22, and 33 connected with each other are simultaneously selected. A signal delivery and reception switch is provided to switch over the sensor coils from a signal transmitting condition to a signal receiving condition and vice versa. In the signal transmitting condition, the sensor coils are connected to a signal producing section. In the signal receiving condition, the sensor coils are connected to a signal detecting section.

The one time signal transmitting and receiving operation as above mentioned is repeated by progressively Switching over the terminals of a sensor coil switch 110. Thus in case that the sensor coils are divided into groups, the sensor coil switching times are remarkably reduced when compared with the case in which the sensor coils are not divided into groups. According to the example of FIG. 2, the sensor coil switching times are reduced to one third.

In this method, with the only one time of signal transmitting and receiving operation, it is actually difficult to discriminate which of the mutually connected plural sensor coils are producing which of the signals to be obtained. However if the sensor coil switch is switched over in the order of the terminal numbers 0 to 7, the sensor coils of group I will be selected in the order of 10, 11, 12, 13, 14, 15, 16, 17, the sensor coils of group II will be selected in the order of 20, 22, 21, 24, 23, 26, 25, 27, and the sensor coils of group III will be selected in the order of 31, 33, 30, 35, 32, 37, 34, 36. Thus the sensor coils are connected with each other in the condition that the sensor coils in each group are made distinctly different from those of the other groups with respect to the arrangement and selection order thereof. Therefore with analysis of the received signal pattern formed with the received signals obtained from the mutually connected plural sensor coils and arranged in the receiving order, it becomes possible to discriminate in which of the sensor coil groups the position indicator exists. The detail of this method is disclosed in Japanese Patent Application Publication Laid-open No. H3-147012.

The above description concerns one example of sensor coil pattern which is composed of sensor coils selected from so many ones and connected with each other. Such pattern structure is practically very useful and therefore other sensor coil patterns have been proposed. The present invention relates to a specific sensor coil pattern which is composed of sensor coils selected from so many sensor coils and connected with each other.

The following description concerns the problems to be solved of the conventional coordinate input apparatus and the sensor coil pattern thereof especially in connection with the apparatus installing environments.

FIG. 3A schematically shows an example of a structure of liquid crystal display (LCD) having incorporated therein a coordinate input apparatus which is essentially composed of a sensor surface 100 and a stylus 130. In this structure, an LCD unit is placed at the upper end. The LCD unit is a laminated body composed of a liquid matrix, a transparent electrode, a back light, etc. For the back light, an FL is used and an electric discharging tube is provided at one edge of the unit. A side light may be used in place of the back light. A sensor plate 100, which is the sensor surface, is placed at the rear side of the LCD unit. A flat cable is extended out of one end of the sensor plate so as to deliver and receive signals thereat. Further a shield plate is placed at the rear side of the sensor plate.

A voltage of about 1000 volts is required to drive the electric discharging tube of the LCD back light, and therefore an inverter 140 is normally provided near the electric discharging tube in order to produce such voltage. The inverter 140 is normally a circuit for producing the alternate voltage of 5–12 volts up to about 1000 volts. Such inverter circuit is liable to produce a noise. Therefore the other circuits placed near the inverter circuit will have an adverse influence inviting the noise to the input lines thereof due to the electromagnetic connections even if the lines are not directly connected to the inverter circuit.

FIG. 3B is provided to show the adverse influence of the noise produced from the inverter 140 to the sensor coils on the sensor plate 100. In case the inverter 140 is placed as shown in this figure, the sensor coil 10 at the end adjacent to the inverter is most influenced by the inverter. FIGS. 5A to 5C show the shapes of received signals in various conditions. FIG. 5A shows a most preferred shape of received signals. FIG. 5B shows a shape of waves of received signals appearing on the sensor coil positioned adjacent to the noise source of inverter. Such signal waves have, as shown, barbel-like jitters superposed thereon.

In reference to FIG. 3B again, the problem is that the sensor coil 10 positioned at the end is electrically connected to another sensor coil 20 at the position spaced from the end. In case the noise as shown in FIG. 5B is produced at the sensor coil 10, the same noise will be transmitted to the sensor coil 20 which is electrically connected to the sensor coil 10. As the result, the received signals obtained from the sensor coil 20 will be observed as the waves as shown in FIG. 5B. It is needless to say that if such waves appear at the sensor coil 20, the exact position detecting operation will be adversely influenced. In FIG. 3B, there is no inverter adjacent to the sensor coil 3 positioned at the opposite end. In this case, there is no problem if the sensor coil 37 is connected to the sensor coil 27.

FIG. 4A shows a sensor plate installing environment having another problem involved. This is the case in which the LCD unit is surrounded by an electrically closed metal frame M. An influence of the metal frame M applied to the sensor coils will be explained by means of FIG. 4B. When the stylus 130 is on the sensor coil 10, an electric current IC will flow through the sensor coil 10 due to the magnetic flux produced at the stylus 130. The metal frame M, which constitutes a coil too, will produce an induced current IM which negates magnetic flux of the coil current IC. In short, the induced current IM will weaken the magnetic flux produced at the stylus 130. As the result, the intensity of the received signals obtained from the sensor coil 10 will become weaker than that of the received signals which may otherwise be normal. FIG. 5C shows a wave shape in comparison with a most preferred wave shape of FIG. 5A. This phenomenon is most remarkable when the sensor coil 10 is positioned adjacent to the metal frame M.

Here it is also a problem that the sensor coil 10 is electrically connected to the sensor coil 20. The above mentioned phenomenon will also appear when the stylus 130 is on the sensor coil 20. The reason is that the received signals produced at the sensor coil 20, that is, the coil current will flow through the sensor coil 10. Then the coil current will cause the metal frame M to produce an induced current thereat which will negate the coil current of the sensor coil 20 when the current flows through the sensor coil 10. In FIG. 4B, the sensor coil 37 positioned at the opposite end of the arrangement will be also subjected to the same influence. As the result, the sensor coil 26 electrically connected to the sensor 37 will be also subjected to the influence and the intensity of the received will become weaker.

The above mentioned two problematical installing environments concerning the coordinate input apparatus may often concurrently exist. In this case, the received signal property will be further deteriorated due to the doubled adverse influences. Namely a noise will be produced in addition to the reduction of signal intensity and accordingly the S/N rate will be remarkably worsened.

SUMMARY OF THE INVENTION

It is a principal object of the invention to provide a coordinate input apparatus having a sensor coil pattern in which the received signals employed for detecting positions will not be subjected to adverse influences even if a noise source or an electrically closed conductor or both of them may exist in the periphery of a sensor surface of the apparatus.

For the purpose of solving the problem, the present invention provides a structure having the following features:

(1) A sensor coil pattern is used in combination with a coordinate input apparatus having incorporated therein a sensor surface having many sensor coils arranged thereon in parallel with each other in a position detecting direction, a position indicator having a coil or a resonance circuit incorporated therein and switching means so connected as to select simultaneously one or a plurality of sensor coils from the many sensor coils, wherein the coordinates of the position indicator are determined by electromagnetic interaction between the sensor coils and the position indicator, the sensor coil pattern including among the many sensor coils at least one or a plurality of sensor coils counted from one end of the arrangement individually connected to the switching means.

(2) The sensor coil pattern as mentioned at (1) has the at least one or a plurality of sensor coils counted from one end of the arrangement including at least one sensor coil of the two sensor coils positioned at the opposite ends of the arrangement.

(3) In the sensor coil pattern as mentioned at (1) or (2), the sensor coils except the at least one or a plurality of sensor coils counted from one end of the arrangement are each connected to at least one another sensor coil.

(4) In the sensor coil pattern as mentioned at (1) or (2), the sensor coil except the at least one or a plurality of sensor coils counted from one end of the arrangement are connected with each other each in a same number of sensor coils.

(5) The coordinate input apparatus has incorporated therein a sensor coil pattern having many sensor coils arranged on a sensor surface in parallel with each other in a position detecting direction, a position indicator having a coil or a resonance circuit incorporated therein and switching means so connected as to select simultaneously one or a plurality of sensor coils from the many sensor coils, wherein the coordinates of the position indicator are determined by electromagnetic interaction between the sensor coils and the position indicator, the many sensor coils including at least one or a plurality of sensor coils counted from one end of the arrangement individually connected to the switching means.

(6) The coordinate input apparatus as mentioned at (5) has the sensor coil pattern having the at least one or a plurality of sensor coils counted from one end of the arrangement including at least one sensor coil of the two sensor coils positioned at the opposite ends of the arrangement respectively.

(7) In the coordinate input apparatus as mentioned at (5) or (6), the sensor coils except the at least one or a plurality of sensor coils counted from one end of the arrangement are each connected to at least one another sensor coil.

(8) In the coordinate input apparatus as mentioned at (5) or (6), the sensor coils except the at least one or a plurality of sensor coils counted from one end of the arrangement are connected with each other each in a same number of sensor coils.

(9) The coordinate input apparatus as mentioned at any one of (5) through (8), has an LCD unit incorporated therein which includes a liquid crystal matrix, a transparent electrode and a back light.

(10) The coordinate input apparatus as mentioned at (9) has the at least one or a plurality of sensor coils counted from one end of the arrangement being positioned in the neighborhood of a noise source positioned outside of the apparatus.

(11) The coordinate input apparatus as mentioned at (10) has the noise source formed as an inverter included in the LCD unit.

(12) The coordinate input apparatus as mentioned at (9) has all of the many sensor coils surrounded by an electrically closed conductor.

(13) The coordinate input apparatus as mentioned at (12) has the electrically closed conductor formed as a metal frame included in the LCD unit.

In short, according to the present invention, a sensor coil pattern used in combination with a coordinate input apparatus is so structured as to have many sensor coils arranged on a sensor surface in parallel with each other in a position detecting direction and further have among the many sensor coils at least one or plurality of sensor coils counted from one end of the arrangement being connected to no other sensor coils except being connected to a ground end. The sensor coils having no other sensor coils connected thereto will not give inferior signals to any of the other sensor coils if the former pick up a noise from a noise source of have the signals weakened by an influence of a conductor surrounding the former. Namely according to the invention, by providing a sensor coil pattern having at least one or a plurality of sensor coils, which may be subjected to an adverse influence, connected to no other sensor coils, it becomes possible to prevent, the adverse influence from being extended to the sensor coils existing in the positions not directly subjected to the adverse influence.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF DRAWINGS

A preferred form of the present invention is illustrated in the accompanying drawings in which:

FIG. 8 is a plan view of another embodiment of sensor surface of the coordinate input apparatus schematically shown in accordance with the present invention.

DETAILED DESCRIPTION OF THE PREFERRED EMBODIMENTS

Figure 1:
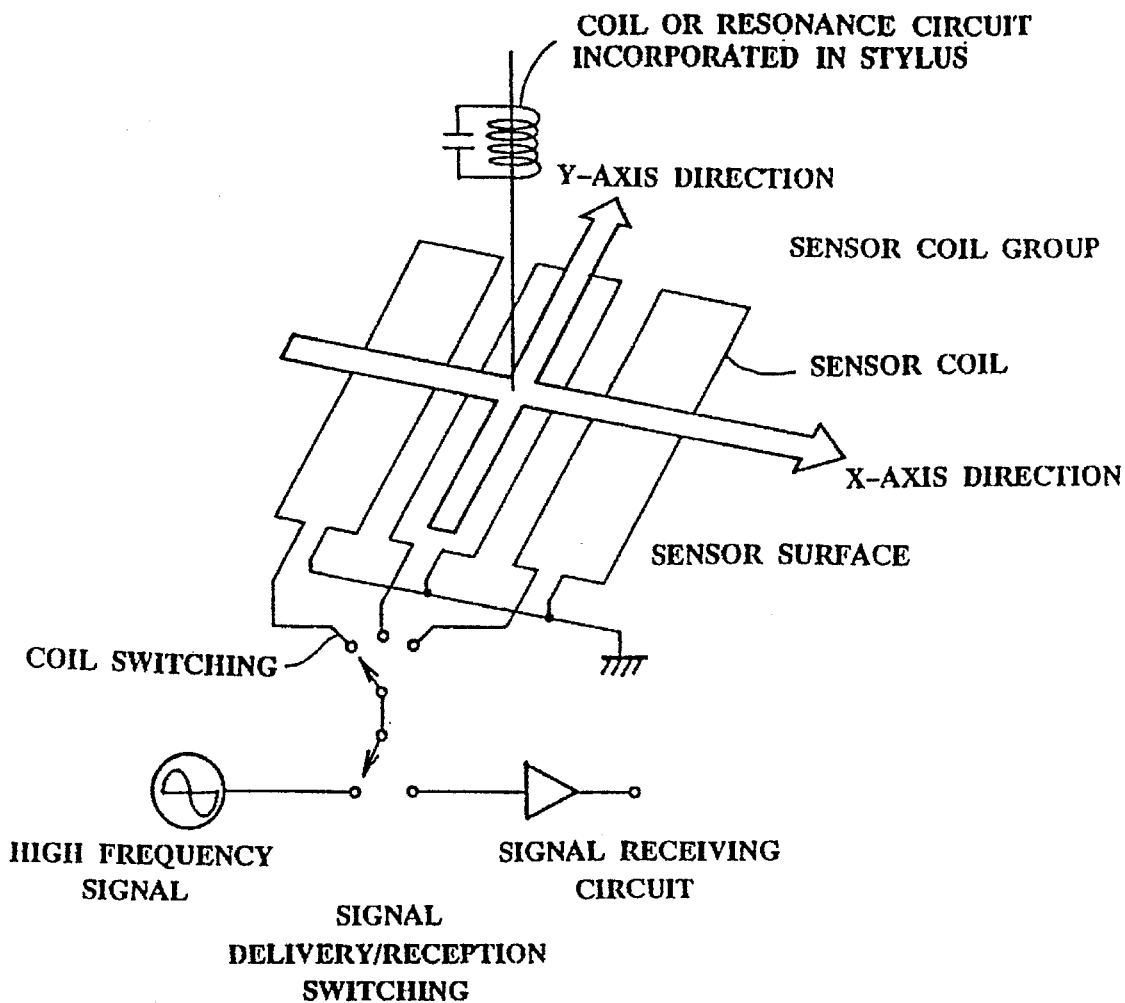
FIG. 1 is a top perspective view of a coordinate input apparatus schematically shown for explaining a basic operation for detecting positions in an electromagnetic signal transmitting and receiving method.
Figure 2:
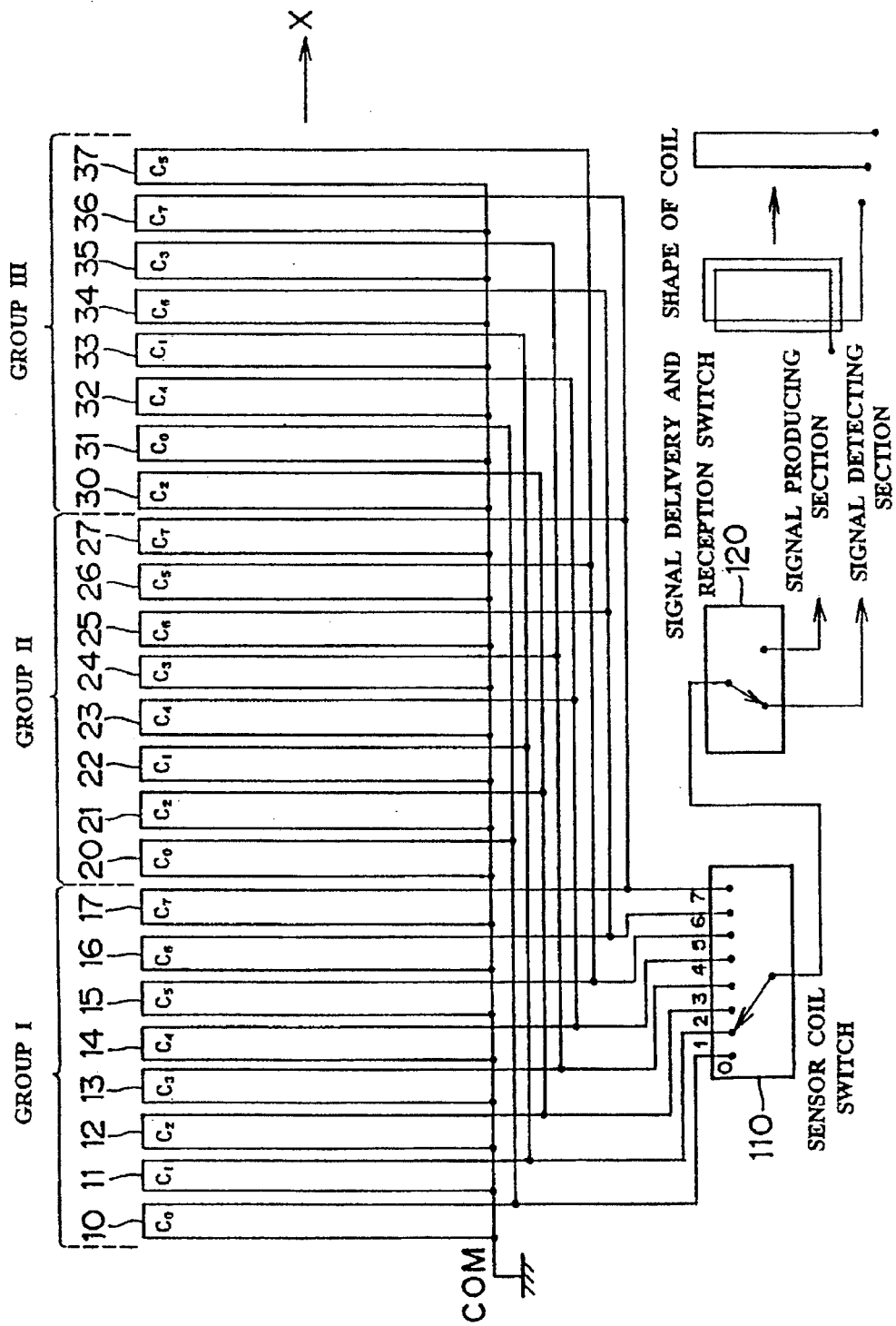
FIG. 2 is a plan view of a pattern schematically showing a conventional way of coil connection on the sensor surface.
Figure 3A:
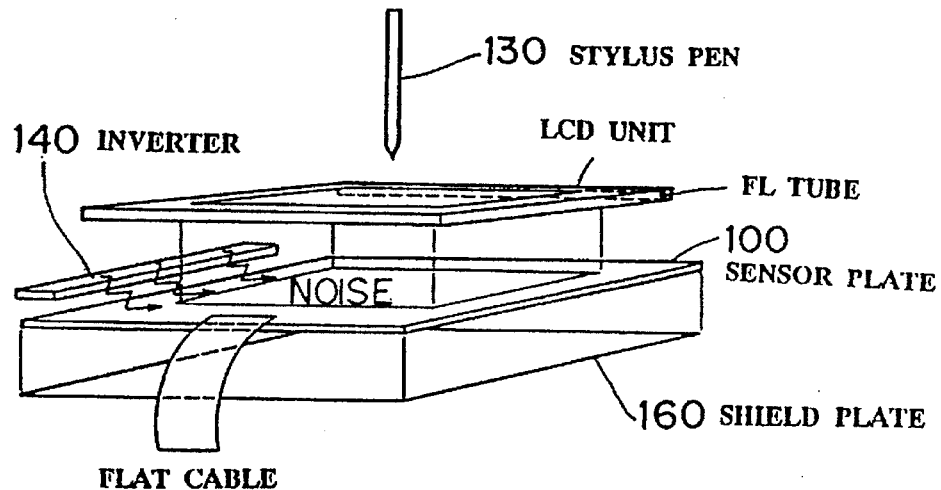
FIG. 3A is a perspective view of a liquid crystal display (LCD) schematically showing the structure thereof having incorporated therein a coordinate input apparatus composed of a sensor surface 100 and a stylus 130.
Figure 3B:
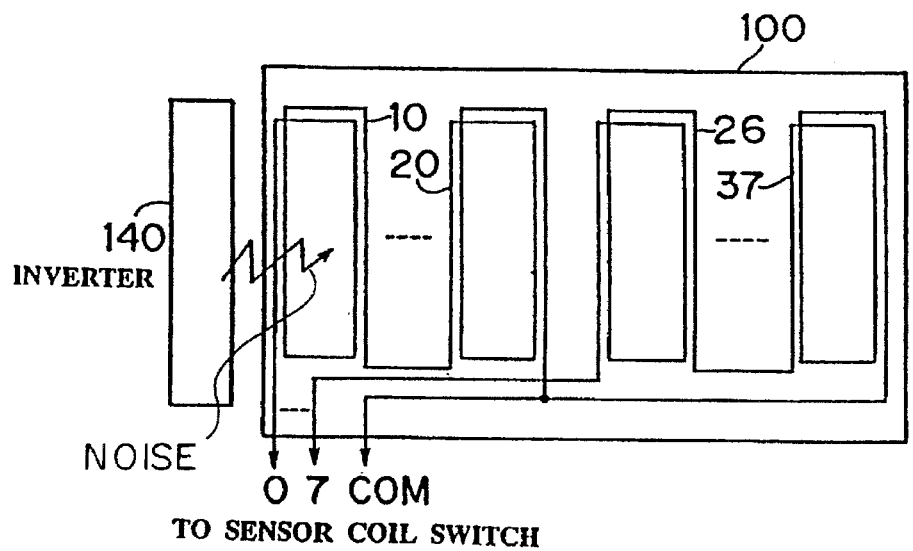
FIG. 3B is a plan view of the sensor surface 100 of FIG. 3A shown more detail in connection with an inverter 140.
Figure 6:
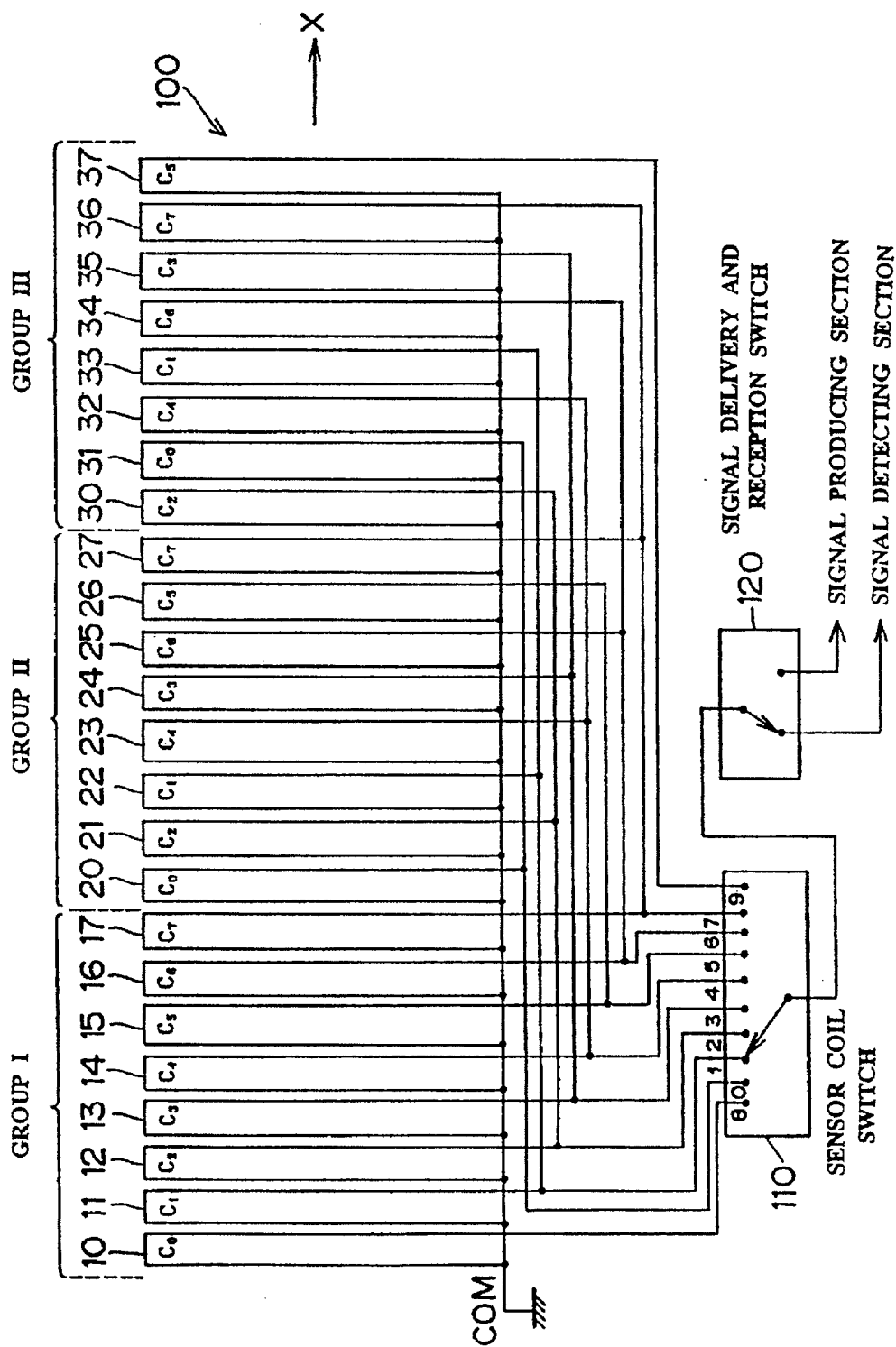
FIG. 6 is a plan view of one embodiment of sensor surface of a coordinate input apparatus schematically shown in accordance with the present invention.

The present invention will now be explained in reference to FIGS. 6, 7A and 7B. FIG. 6 is a schematic illustration showing a sensor surface of a coordinate input apparatus by way of example according to the invention. For the sake of comparison, FIG. 6 is the same with the prior art as shown in FIG. 2 except the method of sensor coil connections. Further for the sake of simplification, FIG. 6 is shown only in connection with X-axis, but the things are the same with respect to Y-axis. FIG. 6 is different from FIG. 2 in the point that the sensor coils 10 and 37 positioned at the opposite ends are not electrically connected to the other sensor coils except that these coils are connected to a ground end (COM).

According to the prior art as shown in FIG. 2, the sensor coil 10 is connected to the sensor coils 20 and 31 and is connected to the terminal 0 of the sensor coil switch 110. Further according to FIG. 2, the sensor coil 37 is connected to the sensor coils 15 and 26 and is connected to the terminal 5 of the sensor coil switch 110. In FIG. 6, the sensor coil 10 is not connected to any of the other sensor coils and is individually connected to the terminal 8 of the sensor coil switch 110. Further the sensor coil 37 is not connected to the any of the other sensor coils and is connected to the terminal 9 of the sensor coil switch 110. The sensor coil switch has a function for selecting simultaneously one or a plurality of sensor coils from many sensor coils and scans the sensor coils on the sensor surface by progressively switching over the terminals thereof. Further the sensor coil switch 110 is connected to the signal transmitting and receiving switch 120 which has two terminals connected to a signal producing section and a signal detecting section respectively. The signal producing section and the signal detecting section may be contained in the coordinate input apparatus or in an upper information processing apparatus.

A term "individual connection" may be used hereafter in reference to the connecting condition that the sensor coils, just like the sensor coils 10 and 37, are not connected to any other sensor coils except being connected to the ground end. In this invention, the meaning of "individually connected sensor coil" includes not only a pattern of connected sensor coils on the sensor surface but also such pattern that includes the sensor coils having no line to be commonly used at one time with any of the other sensor coils for transmission of delivered or received signals in the process of position detection.

According to the embodiment shown in FIG. 6, as the sensor coils positioned at the opposite ends are so constituted as not to be electrically connected to any other sensor coils, the received signals on the oppositely positioned sensor coils will give no adverse influence to any of the other sensor coils, if the received signals are subjected to an adverse influence. FIGS. 7A and 7B are provided to show in more detail the sensor coils positioned at the opposite ends in FIG. 6 in case a noise source such as an inverter exists (FIG. 7A) and a metal frame exists (FIG. 7B). Among the sensor coils, only two sensor coils 10 and 37 are individually connected to the sensor coil switch. The other sensor coils are selectively connected with each other as usual. It is to be noted that FIG. 6 is a schematic illustration makes it possible to optionally select the number and size of sensor coils and the sensor coils to be connected with each other (except the sensor coils positioned at the opposite ends) and to optionally overlap the sensor coils and so on.

Figure 7A:
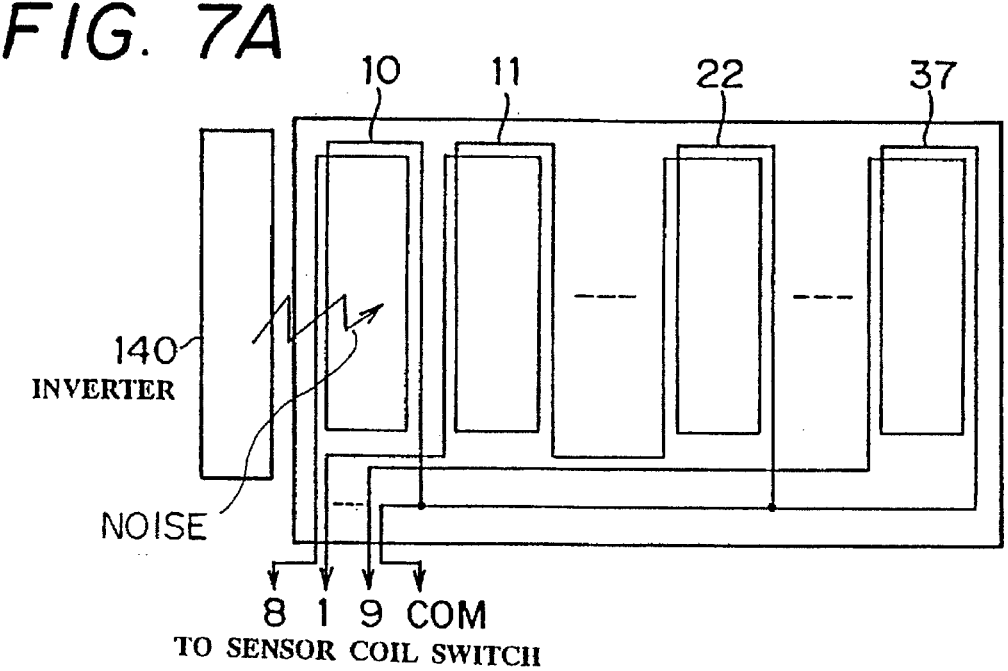
FIG. 7A is a plan view of the sensor surface of FIG. 6 shown in more detail in connection with an inverter placed nearby as a noise source.

FIG. 7A shows a condition in which the sensor coil 10 picks up a noise from the inverter 140 positioned in the neighborhood of the sensor coil. The noise appears at the terminal 8 together with the signal from the sensor coil 10, but will not appear in the signals on the other sensor coils.

Figure 7B:
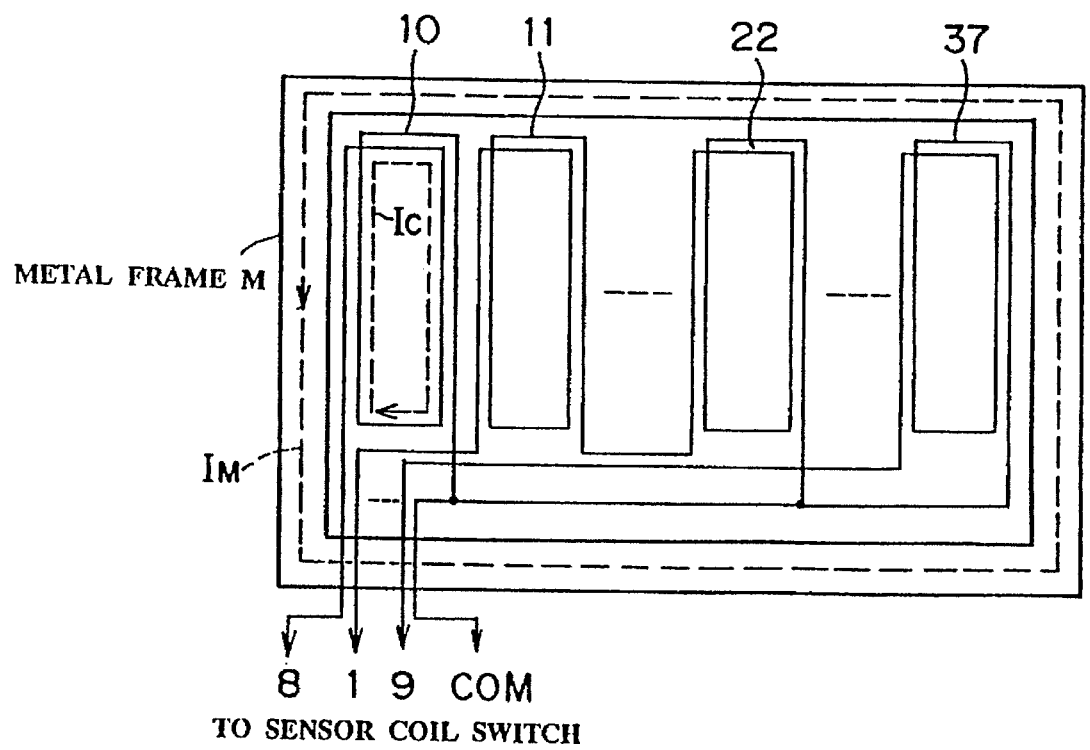
FIG. 7B a plan view of the sensor surface of FIG. 6 shown in more detail in connection with a metal frame placed nearby as a noise source.

FIG. 7B shows a condition in which the sensor coil 10 is subjected to the influence of induced current produced at the metal frame M surrounding the sensor coil. This influence will weaken the signal from the sensor coil 10 when the signal is observed at the terminal 8. However the received signals on the other sensor coils will not have the weakened phenomena which may otherwise be caused by the metal frame M, because the other sensor coils are not connected to the sensor coil 10 and therefore the received signals on the other sensor coils will not flow through the sensor coil 10.

As mentioned above, in the position detecting process of the invention, the positions of the stylus are exactly determined by using the signals of adjacent sensor coils having almost the peak received signals. Therefore as to any of the sensor coils on the sensor surface, the received signals appearing thereon may be used as the data for the position detecting process. It is however generally admitted that the sensor coils positioned near the opposite ends of the arrangement are not required to have so high S/N rate for the received signals compared with the sensor coils positioned in the central part of the sensor surface. Generally in the application software using such coordinate input apparatus, a drawing part required to have a high precision is placed in the central part of the sensor surface and a menu selection function and the like are arranged at the end parts.

Therefore it may be considered that one sensor coil positioned at a most end will not give a significant influence to the position detecting performance. According to the invention, if the sensor coil positioned at the most end has the received signals affected by the influence of the inverter or the metal frame positioned nearby, such influence will affect only a small number of sensor coils positioned near the end positioned sensor coil though the received signals of these sensor coils may be required to be used in the position detecting process. Such influence will, however, not affect the sensor coils positioned in the central part.

In view of the sensor coil pattern so structured in accordance with the present invention, the sensor coil switch 110 is required to have two additional terminals for the sensor coils positioned at the opposite ends respectively and the switching times are additionally increased. However the influence due to such addition of switching times is little and will not give a significant delay of position detecting speed.

FIG. 8 shows another embodiment of the sensor coil pattern of the coordinate input apparatus according to the present invention. The sensor coils 38 and 39 positioned at the opposite ends respectively are, similarly as the first embodiment shown in FIG. 6, arranged in an individual connection where the two sensor coils are not connected to any of the other sensor coils except being connected to the ground end (COM). With such arrangement, if the two opposite sensor coils have the received signals affected by the adverse influence, such influence will not affect the other sensor coils. The embodiment of FIG. 8 is characterized in that except the two sensor coils 38 and 39 positioned at the opposite ends, the other sensor coils are connected with each other each in a same number of sensor coils. For example, the three sensor coils 10, 20 and 30 are connected with each other and the other groups of connected sensor coils are composed of three sensor coils respectively.

In the connecting method of sensor coils in FIG. 8, it is to be noted that the numbers of connected sensor coils are made even in the respective groups and no significance is placed on which of the sensor coils is to be selected (Namely in the embodiment of FIG. 8, the sensor coils of the relatively same positions are connected with each other in the groups I–III, but this is in itself not an essential requirement of the invention). Which of the sensor coils is to be selected is another theme of the position detecting method and not the theme of the present invention.

Figure 4A:
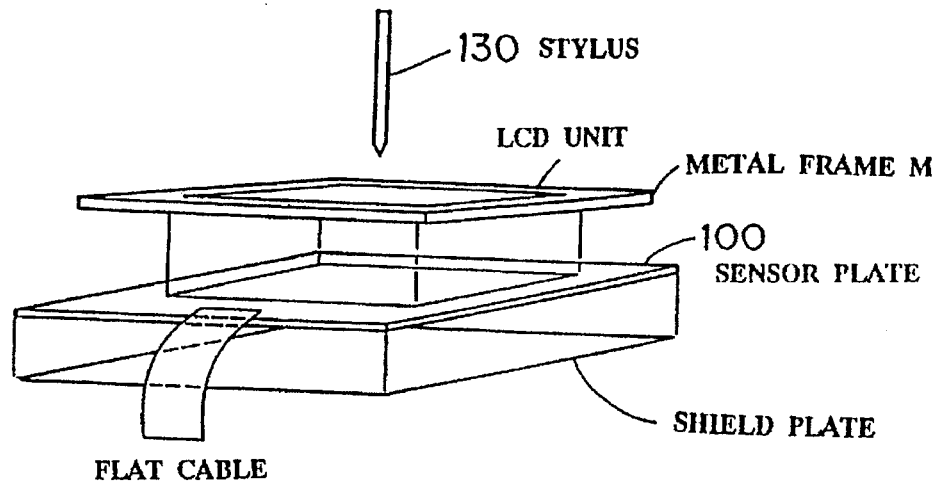
FIG. 4A is a perspective view of another liquid crystal display (LCD) schematically showing the structure thereof having incorporated therein the coordinate input apparatus composed of the sensor surface 100 and the stylus 130.
Figure 4B:
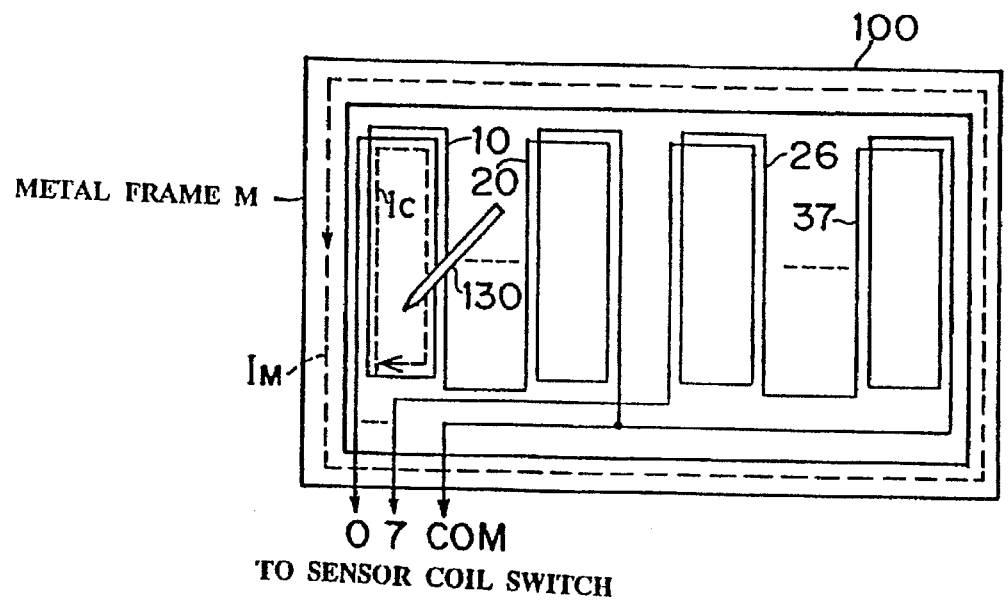
FIG. 4B is a plan view of the sensor surface 100 of FIG. 4A shown in more detail in connection with a metal frame M.
Figure 5A:
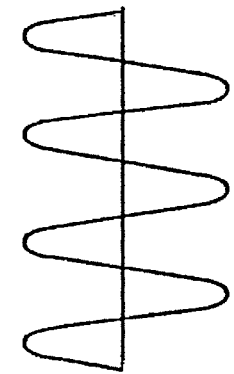
FIG. 5A is a graphic illustration showing a most preferred shape of waves of received signals.
Figure 5B:
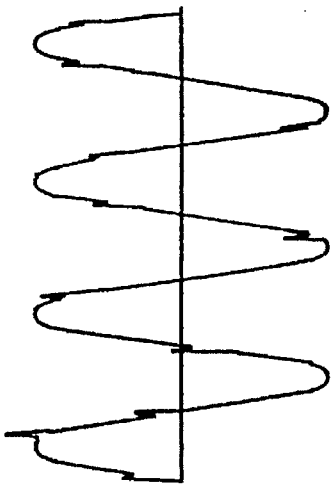
FIG. 5B is a graphic illustration showing a shape of waves of received signals in case the inverter as a noise source exists in the periphery of the sensor surface.
Figure 5C:
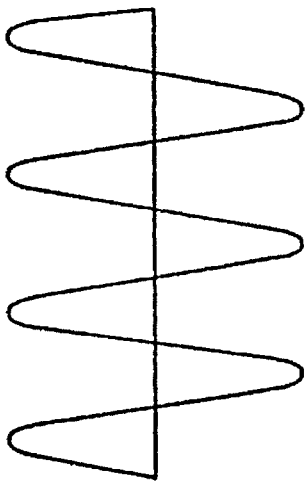
FIG. 5C is a graphic illustration showing another shape of waves of received signals in case the metal frame as a noise source exists in the periphery of the sensor surface.

In contrast to the embodiment of FIG. 8, according to the embodiment of FIG. 6, except the sensor coils 10 and 37 positioned at the opposite ends, the sensor coils 20 and 31 and the sensor coil 15 and 26 are connected with each other each in the same number of two sensor coils, and the other sensor coils are connected with each other each in the same number of three sensor coils. In case such groups of different numbers of connected sensor coils are mixedly arranged, problems may happen. As explained in reference to FIG. 4B, a magnetic flux produced by a whirlpool current induced to the metal frame M will weaken the magnetic flux which is produced by the sensor coils (the magnetic flux to be given to the stylus). The degree of the magnetic flux thus weakened is larger in case the sensor coils connected with each other are essentially of plural windings than the degree in case the sensor coils are of the individual connection (a single winding). Such adverse influence is larger as the number of sensor coil winding increases. In view of the fact that the influence of the whirlpool current induced to the metal frame M is different in dependence upon the number of connected sensor coils, the difference in the winding number of sensor coils will cause difference in the levels of signals to be obtained. Further the whirlpool current produced at the metal frame M is varied in dependence upon the location of the frame. One of the causes is that the conductivity of the metal frame M is not constant. This is caused due to a varied plating and the like of the metal frame M (surface condition, thickness). Another cause is that the relative position between the metal frame M and the sensor coils is varied due to the errors in arrangement of the sensor coils. The variation in the conductivity of metal frame M will further vary the variation of signal levels obtained from the connected sensor coils.

Therefore it is desirable that the numbers of connections are made equal in order to reduce to minimum the variations of signal levels between the connected sensor coils. In this way the influence is reduced to be caused by the variation in conductivity of the metal frame M and the position detecting precision of the connected sensor coils is stabilized in the central part of the sensor surface.

So far explanation has been made as to the sensor coils positioned at the opposite ends and used in the individual connection. However another embodiment may be considered where the second sensor coil counted from the end is used in the individual connection in addition to the first one. In this case, four of all the sensor coils arranged in one axis direction are individually connected to the sensor coil switch. The second sensor coil will have not so much influence received from the inverter or metal frame nearby as the first sensor coil will have. Even if such small influence is not allowed to affect the sensor coils positioned in the central part, such structure is desirable to prevent such influence from affecting the central sensor coils.

Figure 9:
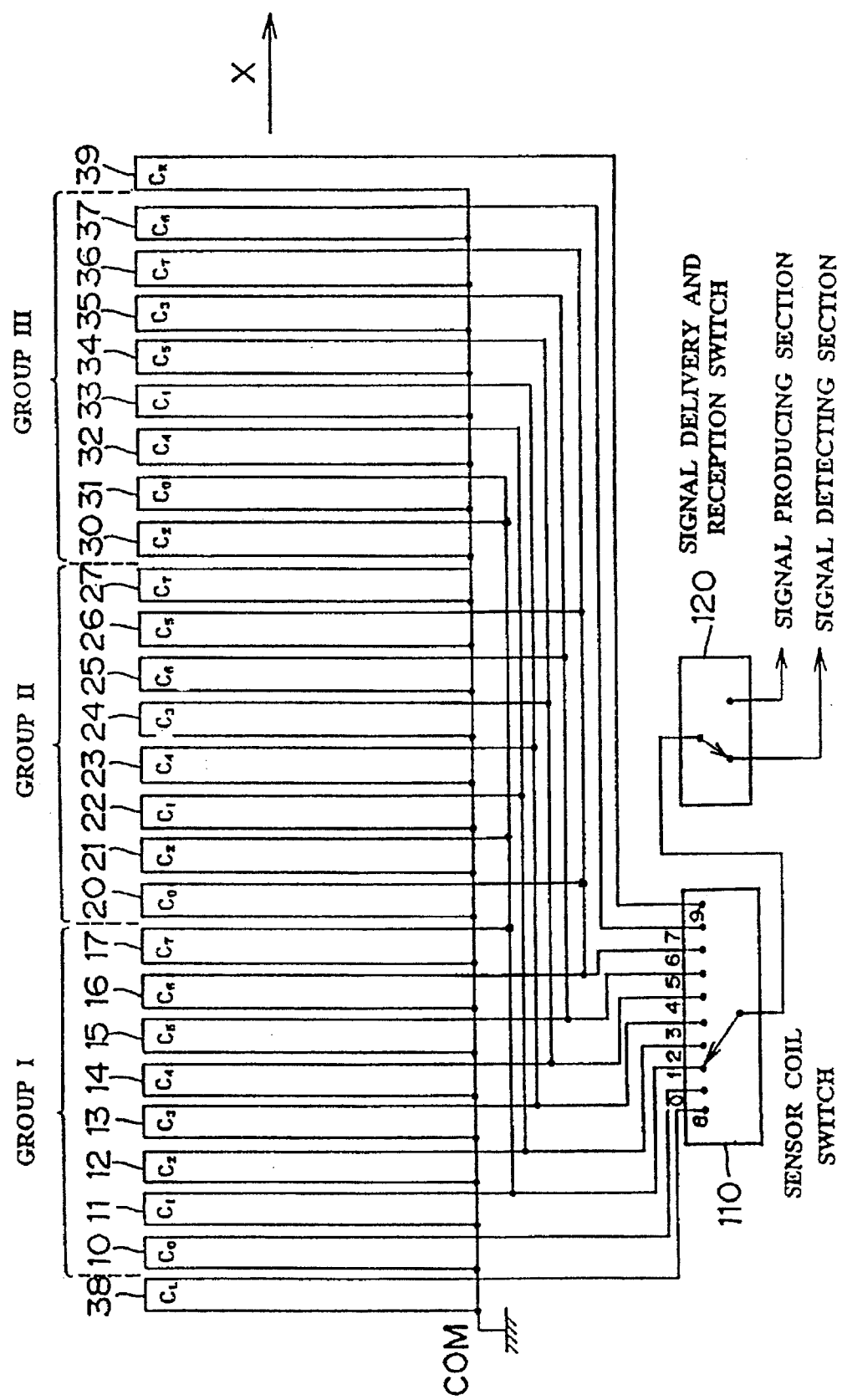
FIG. 9 is schematic plan view of yet another embodiment of a sensor surface for a coordinate input apparatus in accordance with the present invention.

Referring to FIG. 9, sensor coils 38 and 10 are individually connected to the sensor coil switch 110. Similarly, sensor coils 37 and 39 are individually connected to the sensor coil switch.

Further another embodiment may be considered where one or a plurality of sensor coils counted from only one end of the arrangement is/are used in the individual connection. Such structure is appropriate in case the inverter is positioned near one of the sensor surface.

Thus the present invention may be applied to at least one sensor coil counted from one end of the sensor surface and the number of sensor coils may be optionally selected. Therefore the number of sensor coil to be used in the individual connection may be determined in dependence upon the allowance limit of the influence of the inverter or metal frame nearby. However if the number of sensor coil used in the individual connection is excessively increased, the sensor coil switch will have the terminals switched over so many times. It is therefore significant to appropriately determine the number of sensor coils to be used in the individual connection so that the essential merit of the sensor coil pattern will not be decreased.

As is apparent from the above description, the sensor coil pattern of coordinate input apparatus according to the invention is so structured as to have at least one or a plurality of sensor coils counted from one end of the arrangement being individually connected to the sensor coil switch. Therefore if the sensor coil at one end has a received signal adversely influenced, such influence will not affect the other sensor coils. It is therefore apparent that if the coordinate input apparatus of the present invention is placed in the neighborhood of a noise source or is surrounded with a metal frame, the apparatus is capable of maintaining a desired S/N rate on an almost entire part of the sensor surface thereby to carry out an exact position detecting operation.

Although the present invention has been described in its preferred form, it is understood that the present disclosure of the preferred form has been changed in the details of construction and the combination and arrangement of parts may be resorted to without departing from the spirit and the scope of the invention as hereinafter claimed.

What is claimed is:

1. A sensor surface for use with a coordinate input apparatus, comprising:
   a) a plurality of sensor coils arranged on said sensor surface in parallel with each other in a position detecting direction, a predetermined number of sensor coils from said plurality of sensor coils being selected and connected with each other; and
   b) at least one of said plurality of sensor coils counted from one end of the arrangement for being individually connected to a switch for transmission of delivered or received signals to said plurality of sensor coils such that said at least one is not connected to any other sensor coils, whereby the received signals on said at least one will not adversely influence any of the other sensor coils when the received signals are subjected to adverse influence.

2. A sensor surface as in claim 1, wherein:
   a) said at least one of said plurality of sensor coils includes the outermost sensor coils of the arrangement.

3. A sensor surface as in claim 1, wherein:
   a) said predetermined number of sensor coils being connected to at least one other sensor coil.

4. A sensor surface as in claim 1, wherein:
   a) said predetermined number of sensor coils being divided into groups, each sensor coil from one group being connected to a sensor coil in each of the other groups.

5. A coordinate input apparatus, comprising:
   a) a sensor surface including a plurality of sensor coils arranged on said sensor surface in parallel with each other in a position detecting direction, a predetermined number of sensor coils from said plurality of sensor coils being selected and connected with each other;

b) a position indicator having a resonance circuit incorporated therein; and c) at least one of said plurality of sensor coils counted from one end of the arrangement for being individually connected to a switch for transmission of delivered or received signals to said plurality of sensor coils such that said at least one is not connected to any other sensor coils, whereby the received signals on said at least one will not adversely influence any of the other sensor coils when the received signals are subjected to adverse influence.

6. A sensor surface as in claim 5, wherein:

a) said at least one of said plurality of sensor coils includes the outermost sensor coils of the arrangement.

7. A sensor surface as in claim 5, wherein:

a) said predetermined number of sensor coils being connected to at least one other sensor coil.

8. A sensor surface as in claim 5, wherein:

a) said predetermined number of sensor coils being divided into groups, each sensor coil from one group being connected to a sensor coil in each of the other groups.

9. A coordinate input apparatus as in claim 5, and further comprising:

a) a closed conductor surrounding said plurality of sensor coils.

10. A coordinate input apparatus as in claim 5, and further comprising:

a) an LCD unit disposed on top of said sensor surface.

11. A coordinate input apparatus as in claim 10, wherein:

a) said LCD unit includes an inverter; and b) said at least one of said plurality of sensor coils is disposed in the neighborhood of said inverter.

12. A coordinate input apparatus as in claim 10, and further comprising:

a) a metal frame surrounding said plurality of sensor coils.

* * * * *